Figure 1:
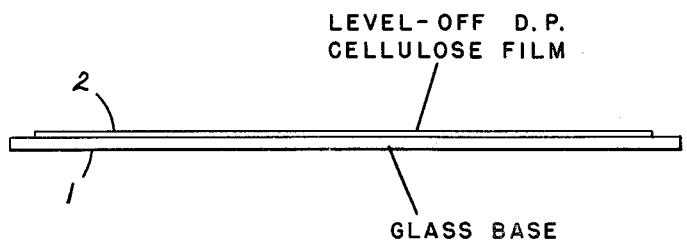

Nov. 16, 1965  O. A. BATTISTA  3,218,223

GLASS COATING AND LAMINATING AND ARTICLES

Original Filed Feb. 23, 1960

United States Patent Office  3,218,223
Patented Nov. 16, 1965

3,218,223
GLASS COATING AND LAMINATING
AND ARTICLES
Orlando A. Battista, Drexel Hill, Pa., assignor, by mesne assignments, to FMC Corporation, San Jose, Calif., a corporation of Delaware
Original application Feb. 23, 1960, Ser. No. 10,072, now Patent No. 3,157,518, dated Nov. 17, 1964. Divided and this application Feb. 9, 1962, Ser. No. 172,216
14 Claims. (Cl. 161—200)

This application is a division of copending application Serial No. 10,072, filed Feb. 23, 1960, now Patent No. 3,157,518 which is a continuation-in-part of application Serial No. 636,639, filed Jan. 28, 1957, and now abandoned.

This invention relates to coated glass products and more particularly to glass products having an extremely adherent hydrophilic coating.

A wide variety of shaped products are formed from glass and the term "glass products" is intended to include this variety of shaped glass products. For example, fibers and filaments formed of glass are employed for many different purposes including textile fabrics. Such fibers and filaments, because of their low resistance to abrasion and relatively high brittleness as compared to organic fibers, cannot be processed on conventional textile equipment as normally employed for the organic textile fibers. Glass sheet is employed in the arts for a wide variety of purposes. For example, window panes, walls of cases, microscope and projection slides and the like. Other shaped articles include containers such as bottles, laboratory equipment and the like. In order to apply indicia to any of such sheet or other shaped articles, it is common practice to etch a portion or all of the surface either by chemical means, as with hydrofluoric acid, or by abrading such surface whereby a permanent frosted appearance is imparted to the glass.

For many purposes, glass sheet for window construction is etched or provided with a coating so as to permit the passage of light through the glass but disperse the light waves so that objects cannot be distinguished from the opposite sides of the glass. These methods render the glass permanently frosted and where the glass has been etched or roughened, it can no longer be used where transparent glass is required. It has also been comomn practice to apply either a water paint or a permanent paint to render the glass non-transparent. The conventional water paints used as temporary coatings generally consist of a dispersion of a finely divided material and these coatings are objectionable in that they readily dust off and any physical contact removes some of the coating. The permanent paint-type coating while it does not dust off is difficult to remove because of the setting up of the oils or resins constituting the paint vehicle.

The principal purpose of the present invention is to provide glass products with an extremely adherent, yet easily removable coating.

A further purpose of the invention is to provide glass products, such as fibers, filaments and the like with an extremely adherent yet readily removable hydrophilic coating.

Another purpose of the invention is to provide glass fibers and filaments with conventional yarn finishes.

A further purpose of the invention is to provide glass products with a firmly adherent yet readily removable coating adaptable to receiving indicia without altering the glass surface itself.

Another purpose of the invention is to provide glass with a coating closely simulating frosted glass which is firmly adherent to the glass but which may be readily removed from the surface, if desired.

Other objects and advantages of this invention will become apparent from the description and claims which follow.

The present invention is based upon the discovery that an aqueous dispersion of cellulose crystallite aggregates having a level-off D.P. when applied to glass and allowed to dry forms a highly adherent continuous but readily removable film on the glass.

Cellulose crystallite aggreagtes are acid-insoluble products produced by a controlled acid hydrolysis of cellulose and their having a level-off D.P. reflects a destruction of the original fibrous structure of the cellulosic source material. The term "level-off D.P." has reference to the average level-off degree of polymerization measured in accordance with the paper by O. A. Battista entitled "Hydrolysis and Crystallization of Cellulose," vol. 42, Industrial and Engineering Chemistry, pages 502–7 (1950). A method of forming cellulose crystallite aggregates having a level-off D.P. and a method of disintegrating the aggregates to reduce a mass of aggregates to a colloid-forming size are described in United States Patent 2,978,466, dated April 4, 1961.

As described in the aforementioned patent, a cellulose material is subjected to a controlled acid hydrolysis to dissolve amorphous forms of cellulose leaving as a residue cellulose crystallite aggregates. The cellulose is subjected to the hydrolysis treatment for a time and at a temperature sufficient to disrupt the continuity of the fine structure. One such method comprises treating the cellulose with a 2.5 normal hydrochloric acid solution for 15 minutes at the boiling temperature of the solution. Another suitable method involves treating the cellulose with a 0.14 normal (0.5%) hydrochloric acid solution at 121° C. under pressure for 1 hour. In accordance with the method as described in the forementioned patent, the insoluble residue is preferably washed free of acid.

The cellulose crystallite aggregates which are recovered from the hydrolysis treatment have a particle size in the range of from less than 1 micron to about 300 microns as determined visibly by microscopic examination and may be designated as "as-formed cellulose crystallite aggregates." As described in the aforementioned patent, by subjecting a mass of crystallite aggregates to a mechanical disintegration so as to produce a mass of disintegrated aggregates wherein at least about 1% of the cellulose crystallite aggregates, by weight, have a particle size less than about 1 micron, the disintegrated mass is capable of being colloidally suspended in aqueous media; that is, the mass is characterized by forming a stable suspension in aqueous media.

The average level-off D.P. of the cellulose is in the range of about 15 to about 375 anhydroglucose units. The specific average D.P. (degree of polymerization) is dependent primarily upon the specific cellulosic raw material.

The mechanically disintegrated aggregates are dispersed in an aqueous medium having a pH not greater than about 11 to form a colloidal dispersion. The dispersion is stable in the aqueous medium having a pH from about pH 7 to a pH of about pH 11 and may exhibit an appearance which varies from a slight or somewhat opalescent cast to a thick creamy paste or thixotropic gel depending upon the concentration and particle size of the cellulose crystallites in the aqueous medium. In general, dispersions containing about 3% or more, by weight, of the level-off D.P. cellulose or dispersed cellulose crystallites exhibit thixotropic properties while those containing lesser proportions of the cellulose exhibit a milky appearance or a slight opalescent appearance again depending upon the amount and size of dispersed cellulose. The mechanical disintegration breaks up the aggregates into some particles of less than one micron in size although some of the particles appear to be as large as 200 and 300 microns in size. The particles of these dispersions remain suspended for prolonged periods of time although some of them are relatively large. Some separation according to particle size, however, may be made by diluting the suspension so that the cellulose content is less than about 1%. Upon such dilution and after standing for about 2 hours, the larger particles will remain suspended in the lower portion of the liquid and above this lower layer, there is a layer with a slight opalescent appearance wherein the maximum particle size appears to be about 5 microns and some particles do not exceed about 0.5 micron in diameter.

Following mechanical disintegration, it may be desirable to fractionate the disintegrated aggregates into fractions having a more homogeneous particle size distribution. Thus, using such separation procedures as mechanical sifting, settling in water, or centrifuging, a number of useful fractions may be obtained, including (1) a fraction having a particle size of up to 0.2 micron, which produces very clear, transparent films from aqueous dispersions and gels having a wide range of pH, say pH 2 to 11; (2) a fraction having a size of up to 1 micron, from which colorless films are obtained over a pH range of about 4 to 10; (3) a fraction having a size of up to 2 microns which also produces colorless films over a pH range of about 4 to 10; (4) a fraction having a size of 1 to 5 microns, the films from which begin to show a slight haze, and the preferred pH range being about 6 to 10; (5) a 1 to 10 microns fraction which produces milky films from a dispersion or gel having a pH of about 6 to 10; (6) a fraction having a size range from 1 to more than 10 microns which produces opaque films from dispersions or gels having a somewhat higher pH, say pH 7 to 11. A desirable way of obtaining the foregoing fractions is to take the aqueous dispersion or gel, either of which may be termed a suspension, resulting from the mechanical disintegration step, dilute the same with water so that the content of aggregates is about 1% by weight or less, let the resulting suspension stand for several hours or until the upper layer has a smooth opalescent appearance, and then to separate such opalescent layer as by decanting. It will be found that the opalescent layer contains particles of up to 5 microns in size. To obtain fractions of smaller sizes, the opalescent layer may be centrifuged. Preferred fractions are those of particle sizes of up to 2 microns, that is, fractions (1), (2) and (3). Preferably, too, each dimension of the particles should be within the size range noted for each fraction; in other words, fraction (1), for example, should be made up of particles all of whose dimensions are up to 0.2 micron; however, particles having two dimensions within the size range are quite useful, as are particles having one dimension within the size range although they are less preferred. These considerations also apply to the other fractions described.

The films or coatings produced from the foregoing fractions are all continuous; in particular, those obtained from the fractions of less than 1 micron size are further characterized by their homogeneity, and also by their toughness and adherence; thus, they cannot be scratched or removed by means of one's fingernail but rather require the use of a razor or other sharp blade for this purpose. All of the films are visible; and they are permeable to gaseous materials. It may be noted, in connection with the colorless or transparent films produced from particles of up to 1 or 2 microns, that the dispersions and gels of such particles are also colorless.

Glass including filamentary forms may be coated with the thixotropic gel or with more dilute dispersions or with the dispersion wherein the particles do not appear to exceed about 1 micron in size. Glass coated with the thixotropic gel, or a more dilute dispersion containing the large particles after drying of the dispersion, closely resembles frosted glass. Each of the minute cellulose particles presents a white appearance so that the entire coated surface appears white or frosted. On the other hand, by coating the glass with a dispersion wherein all of the particles are not more than about 1 micron in size forms a dried film which has the appearance of a colorless film. These films are continuous, self-adherent films and cannot be scratched or removed as by scratching with a fingernail but can be scratched and removed by the use of a sharp metal instrument. However, should it be desired at any time to remove the film, it may be readily removed by the application of hot water containing a conventional household detergent. After removal of the coating, the glass surface remains unaltered and is again in its initial condition.

Since the coating is substantially pure cellulose, any desired indicia may be applied to the glass by applying the indicia to the cellulose surface and may be readily removed without in any way affecting or injuring the surface of the glass. This means provides a simple inexpensive manner for marking bottles and laboratory equipment, for example. It is obvious, however, that this means is not applicable where the glass will be subjected to elevated temperatures which would char the cellulose.

Glass filaments and fibers are brittle and have a poor resistance to abrasion when rubbed together. Because of the non-hydrophilic nature of glass, the conventional yarn finishes have not been satisfactory. It is these inherent characteristics which necessitate special handling in converting such filaments and fibers into textile yarns and threads and textiles.

The cellulose film coating when applied to filaments and fibers, as described for the coating of glassplate, is also extremely adherent to these forms of shaped glass bodies. For this type of product, it is preferred to utilize the dispersions containing the smaller sized particles and to provide a continuous, colorless film on the filaments. The brittleness of the coated filaments is substantially reduced and the resistance to abrasion approaches that of cotton and regenerated cellulose fibers and filaments and allows processing on conventional textile equipment. Cellulose, being hydrophilic, permits the application of the conventional yarn finishes as normally applied to cotton and regenerated cellulose fibers and filaments, thereby further simplifying the converting of the filaments and fibers into yarns and threads and textiles by conventional textile processing equipment.

A great number of yarn finishes are employed in the processing of cellulosic fibers and textiles, the specific composition being selected to satisfy particular conditions. In some instances, the finish is utilized as a temporary dressing as for the lubricating or sizing of the yarns in knitting and weaving processes after which the finish or dressing is removed. These various types of finishes are equally satisfactory as finishes or dressings for glass fibers and filaments having a coating of level off D.P. cellulose. Where desired, both the finish and the level-off D.P. cellulose may be removed after they have served their purposes by scouring with hot water containing a detergent.

Glass filaments having a colorless coating of level-off D.P. cellulose, for example, may be provided with a yarn finish such as those disclosed in Patent No. 2,663,989. This type or class of coating is an aqueous emulsion or dispersion comprising, by weight, 2 parts to 10 parts of a water-dispersible polymeric colloid, 1 part to 15 parts of an emulsifier such as a polyethylene glycol ether of a compound such as castor oil or hydrogenated castor oil and containing from about 80 to 200 ethoxy groups per molecule, 1 part to 5 parts of an alkaline buffer and about 0.5 part to 15 parts of a lubricant comprising at least 0.5 part of a waxy partial ester of an anhydro-hexahydric alcohol and a fatty acid having at least 16 carbon atoms. The amount of water may vary depending upon the specific use and the amount of finish desired on the filaments.

As the water-soluble or dispersible binding colloid, there may be used polyvinyl alcohol, the alkali metal or NH$_4$ salts of copolymers of styrene and fumaric (maleic) acids (such as the product available under the trade name "Stymer"), polymethacrylic acid, polyvinyl acetates which have been partially deacylated sufficiently to render them water-dispersible or preferably water-soluble, also the salts of such copolymers and polymers, sodium carboxymethyl cellulose of low, medium or high viscosity, water-soluble methyl cellulose, water-soluble hydroxyethyl cellulose, water-soluble polymers of dimethylhydantoin formaldehyde, gelatine, chromated gelatines, starch, and degradation products such as dextrines or mixtures of two or more of these colloids.

As the alkaline buffer, the alkali metal salts of the higher fatty acids having at least 12 carbon atoms are extremely valuable, such as sodium oleate, sodium palmitate, sodium laurate and sodium stearate. Also amines such as hydroxyalkyl amines of which triethanol amine and tris-hydroxy methylamino methane are representative, and long chain fatty amines such as lauryl, myristyl, hexadecyl, and octadecyl amines. Such buffers impart a lubricating effect upon the final products. Other buffers can be used, such as sodium sorbitol borate, sodium bicarbonate, sodium phosphate.

The lubricant comprises as an essential constituent a waxy partial ester, a waxy partial mixed ester, or a waxy mixture of partial esters, of an anhydro hexahydric alcohol and a fatty acid of at least 16 carbon atoms. When a mixed ester or mixture of esters is used, a part of the fatty acid component may be derived from acids having at least 12 carbon atoms. The acid components are balanced to provide an ester of solid waxy character rather than of a liquid consistency. Examples of the waxy ester lubricant are as follows: sorbitan or mannitan monopalmitate, sorbitan or mannitan dipalmitate, sorbitan or or mannitan mono- or distearate, sorbitan or mannitan palmitate laurate, mixtures of any of these esters, as well as mixtures of one or more thereof with sorbitan or mannitan mono- or dilaurate, which have a waxy consistency. Other lubricants may be added, such as any mineral oil whether of naphthenic, aliphatic, aromatic, or mixed character, fats or oils of vegetable, animal or fish origin which may also be hydrogenated, if desired.

The application of a yarn finish or dressing may be specifically illustrated by reference to the utilization of an emulsion made as described in the aforementioned patent and containing, by weight:

0.25 part—polyvinyl alcohol
0.25 part—sodium oleate
0.2 part—sorbitan monopalmitate
0.4 part—castor oil modified with ethylene oxide (about 127 ethylene oxide groups per mole of castor oil)
85 parts—water The dressing was applied to a bundle of continuous glass filaments having a coating of level-off D.P. cellulose formed from a dispersion as described hereinbefore by passing the filaments through the emulsion and then passing the filaments between rubber rollers so as to remove excess quantities of the emulsion. The filaments were dried and subsequently woven into a fabric on conventional textile equipment as employed in forming fabric from regeneraed cellulose yarns.

Figure 2:
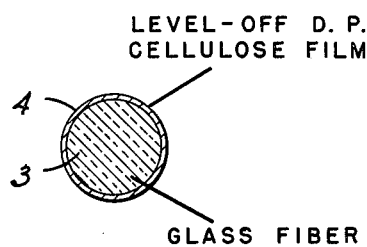

The products of this invention are illustrated diagrammatically in the drawings. As shown in FIGURE 1, the glass base 1 which may be in the form of a sheet or any desired shape carries the film 2 of level-off D.P. cellulose. The glass fiber or filament 3 of FIGURE 2 carries a thin film 4 of the level-off D.P. cellulose.

The thickness of the coatings or films may be varied depending upon the specific glass structure and the specific purpose for the coating. Where the coating is applied to furnish a hydrophilic surface on fibers and filaments, the coating would be relatively thin while a coating on a glass sheet to form a frosted glass window pane, would be relatively great. Continuous films of the level-off D.P. cellulose may vary from about 0.0001 inch to 0.005 inch or more. For the thicker coatings, successive applications of the dispersions are applied, drying each coating before the application of the succeeding coat. More concentrated dispersions of the cellulose may be employed in the production of thicker films, however, the successive application of dispersions containing between 2% and 5% cellulose have been found to result in very adherent and satisfactory coatings.

The invention is also applicable to laminating of glass bodies and will permit the lamination of other materials to glass such as cellulosic materials. For example, paper, non-fibrous cellulose films (cellophane) and the like. The invention may be further illustrated by the following examples.

*Example I*

An aqueous dispersion of cellulose crystallite aggregates was prepared by first forming a 15% by weight suspension of aggregates, as obtained from the acid hydrolysis and water washing steps, in water. The aggregates had an average level-off D.P. of 220 and were in the air dried state prior to making up the suspension. In the air dried state, the aggregates are white in color. The suspension was then mechanically disintegrated in a Waring Blendor for 15 minutes, a butter-like gel resulting containing 15% by weight of aggregates having a particle size ranging from less than 1 to about 250 to 300 microns. A portion of the gel was diluted with water to a 1% solids content and then allowed to stand for about a week. After this period, two layers formed, a lower layer comprising about 99% by weight of solid aggregates, which rested on the bottom of the container, and a large opalescent-appearing upper layer which contained about 0.6% by weight of the aggregates. The upper layer was decanted from the container and upon microscopic examination was found to contain particles all of which were less than 1 micron in size and which exhibited Brownian motion. This opalescent aqueous dispersion of the crystallites was then used to coat a bundle of clean glass fibers of a diameter of approximately 9 microns. Upon air drying the fibers, a colorless adherent film was formed on them. The coated fibers had a definitely soft touch, or hand, whereas in the uncoated state they had a harsh feel or hand. Also, breakage of the coated fibers, during textile processing, is very substantially reduced, by comparison with the uncoated fibers, owing to the decreased resistance to abrasion between the fibers provided by the coatings. The tenacious adherence of the coatings to the fibers was noteworthy, the coating being removable only when a sharp instrument such as a razor blade was employed to scrape it off.

*Example II*

A portion of the butter-like gel of Example I, containing 15% solids, was spread over the surface of a clean glass plate, and the plate then dried in air to produce a white frosty-appearing film thereon. When the plate and film were viewed in cross-section under the microscope, the film appeared to be made up of discrete particles or tiny projections or protuberances adhered to the glass surface with each more or less separated from its neighbors. The film could be readily shown to be a self-supporting one when the gel was spread over a wax surface, or a surface that had been pretreated with a release agent like a silicone; in this case, the film could be lifted from the surface in its entirety. When a portion of the opalescent aqueous dispersion of Example I was applied to the surface of a clean glass plate and the resulting film viewed in cross-section under the microscope, the film appears to be homogeneous as well as continuous.

Example III

Two glass plates, each 6" x 4" and approximately ¼" thick, were carefully cleaned and then dried. On the surface of one plate, there was deposited a colloidal dispersion of crystallite aggregates having an average level-off D.P. of 220 and a particle size of 1 micron or less. The layer of dispersion was allowed to partially dry until it became somewhat tacky, and at this point the other glass plate was superimposed on it to form a sandwich. Drying of the sandwich was then completed in an air oven at 60° C., after the glass plates were first clamped together. A clear glass sandwich in which the two plates held together was obtained.

Example IV

In this case, the experiment was the same as in Example III except that the coating was prepared by means of a gel like that used in Example II. The resulting sandwich had a frosted rather than a transparent appearance, and the plates were not as tenaciously stuck to each other as in Example III.

The foregoing specific disclosure is intended solely to illustrate the broad nature of the present invention and has not been included as a limitation of the invention. The specific dispersions employed for the production of specific glass products may be varied to suit individual requirements. It is to be understood that changes and modifications may be made without departing from the spirit and scope of the invention as defined in the claims which follow.

I claim:

1. As an article of manufacture, glass having a self-adherent, continuous coating of level-off D.P. cellulose.
2. An article of manufacture as defined in claim 1 wherein the cellulose particles have a particle size of not more than about one micron.
3. An article of manufacture as defined in claim 1 wherein the glass is in a filamentary form.
4. An article of manufacture as defined in claim 1 wherein the glass is in a filamentary form and the cellulose particles have a size of not more than about one micron.
5. An article of manufacture as defined in claim 1 wherein the glass is in sheet form.
6. As an article of manufacture, glass filaments, a self-adherent, continuous coating of level-off D.P. cellulose on the filaments and a yarn finish on the cellulose coating.
7. An article of manufacture as defined in claim 6 wherein the yarn finish comprises, by weight, 2 parts to 10 parts of a water-dispersible polymeric colloid, 1 part to 15 parts of an emulsifier, 1 part to 5 parts, of an alkaline buffer and about 0.5 part to 15 parts of a lubricant.
8. An article of manufacture as defined in claim 6 wherein the yarn finish comprises, by weight, about 0.25 part polyvinyl alcohol, about 0.25 part sodium oleate, about 0.2 part sorbitan monopalmitate and about 0.4 part castor oil modified with ethylene oxide.
9. A laminated structure comprising at least one shaped laminae of glass and a second laminae bonded to the glass by means of a continuous film of cellulose crystallite aggregates having an average level-off D.P.
10. A method of providing glass with a self-adherent, continuous coating which comprises applying to the glass an aqueous dispersion of level-off D.P. cellulose particles and drying the coating.
11. A method of providing glass with a transparent, self-adherent, continuous coating which comprises applying to the glass an aqueous dispersion of level-off D.P. cellulose particles of a size not exceeding about one micron, and drying the coating.
12. A method of providing glass filaments with a yarn finish which comprises applying to the filaments an aqueous dispersion of level-off D.P. cellulose particles, drying the coating to form a continuous, self-adherent cellulose film, applying to the cellulose film an aqueous dispersion of a yarn finishing and drying the coated film.
13. A method of rendering glass filaments receptive to organic fiber yarn finishes normally applicable to hydrophilic yarns which comprises applying to the glass filaments an aqueous dispersion of level-off D.P. cellulose particles and drying the coating.
14. A method of laminating glass which comprises applying a colloidal dispersion of cellulose crystallite aggregates having an average level-off D.P. to the surface of the glass, allowing the dispersion to partially dry, superimposing another glass sheet over the partially dried dispersion, pressing the two glass sheets together and completing the drying of the retained dispersion.

References Cited by the Examiner

UNITED STATES PATENTS

| | | | |
|---|---|---|---|
| 2,335,126 | 11/1943 | Lilienfeld | 117—166 |
| 2,978,446 | 4/1961 | Battista et al. | 260—212 |

FOREIGN PATENTS 559,329  2/1944  Great Britain.

JOSEPH B. SPENCER, *Primary Examiner.*

RICHARD D. NEVIUS, *Examiner.*